Sept. 15, 1942.      A. BOYNTON      2,296,198
THREADLESS DRILL STEM
Filed Sept. 22, 1938      2 Sheets-Sheet 1

ALEXANDER BOYNTON, INVENTOR,
BY Jesse R. Stone
Lester B. Clark
ATTORNEYS.

Sept. 15, 1942.  A. BOYNTON  2,296,198

THREADLESS DRILL STEM

Filed Sept. 22, 1938  2 Sheets-Sheet 2

ALEXANDER BOYNTON, INVENTOR,

BY Jesse R. Stone
Lester B. Clark
ATTORNEYS.

Patented Sept. 15, 1942

2,296,198

UNITED STATES PATENT OFFICE 2,296,198

THREADLESS DRILL STEM

Alexander Boynton, San Antonio, Tex.

Application September 22, 1938, Serial No. 231,211

1 Claim. (Cl. 285—146)

My invention relates to rotary drill pipe and, particularly, to a threadless method and means for connecting the joints thereof together, as well as a means for connecting all other pipe shafts and the like.

The principal objects are: (1) To provide a threadless means for connecting the joints together, (2) to enable the drill pipe to be rotated either clockwise or anti-clockwise without danger of the joints becoming disconnected, (3) to connect the joints in such manner as to eliminate compression strains upon the male members and expansion strains upon the female members, (4) to minimize crystallization, (5) to eliminate galling of the mating parts, (6) to provide greater strength than threads afford, (7) to prevent leakage between the male and female members by employing separate replaceable means for that purpose, (8) to eliminate the use of tool joints, (9) to provide for greater speed going in and coming out of the hole than can be obtained by employing threaded connections, and, (10) to provide greater safety for employees on drilling rigs.

By employing a continuous spiral key engaging within continuous spiral keyways, one such keyway being exterior of the drill pipe and the other being interior of the coupling member, in conjunction with packing means and enmeshing longitudinal lands between the drill pipe and coupling, I attain all of the foregoing objects, as will more clearly appear from the following specification and accompanying drawings in which—

Similar reference characters are employed to designate similar parts through-out the several views of each embodiment.

Figure 1:
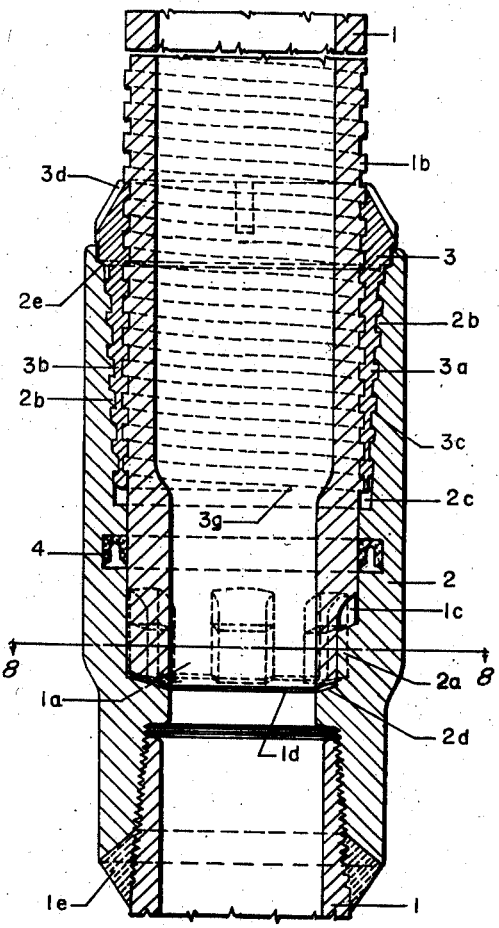
Fig. 1 is a longitudinal section through the preferred embodiment of this invention.
Figure 8:
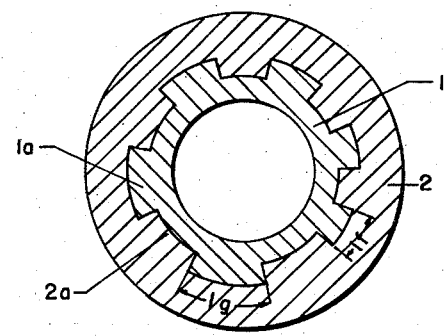
Fig. 8 is a cross section on the line 8—8, Fig. 1.

In Fig. 1 the lower joint of drill pipe 1 is shown threadedly connected into the coupling 2 to which it may be further and permanently secured by weld 1e. The upper joint of drill pipe 1 has a close slidable fit within the coupling 2, and when set down into the coupling, is adapted to engage upon the internal shoulder 2d before the spiral key member 3 is set in place, as in Fig. 1. The lower end of the upper joint of drill pipe has longitudinal cuts 1c forming lands 1a which lands enmesh with the upstanding lands 2a of the coupling 2, as appears in Fig. 8. It will be noted that these lands are of different widths, while all lands may be of the same length and thickness, as shown. To illustrate:

For 4½" drill stem, the designated first land 1f, Fig. 8, may have a width of ¾" by a depth equal to one-half the thickness of the lower upset end of the pipe and the designated last drill pipe land 1g may have a width of 1⅜", while the intermediate drill pipe lands 1f to 1g may be progressively wider than 1f. The length of all lands may be approximately 1½". The drill pipe bottom end lands 1a and the upstanding coupling lands 2a will enmesh, therefore, these longitudinal keys serve two purposes, one, to insure only one relative position of the drill pipe and coupling, in which position the continuous spiral key 3a of the spiral key member 3 is adapted to be rotatably engaged between the similar spiral lands 1b of the drill stem and 2b of the coupling and, two, to transmit tortional stresses.

To form the connection, as shown in Fig. 1, the spiral key member 3 is turned or screwed upward over the lower end of the drill pipe to where its bottom end is high enough to allow the drill pipe to be landed upon the circular shoulder 2d. The drill pipe is then inserted into the coupling and landed upon the shoulder 2d, U-cup 4 having been previously placed. The spiral key member 3 is then turned clockwise into the engagement shown in Fig. 1, at which time the shoulder 3e will be engaged upon the seat 2e in order to further lock the engagement between the members 1, 2, and 3. The turns of the land 1b of the drill pipe are positioned slightly lower than the opposed turns of the land 2b in the coupling when the drill pipe rests upon the shoulder 2d. Therefore, the drill pipe will be raised slightly off of the seat 2d by the spiral key 3a, as shown at 1d, when the spiral key member 3 is in place to form the connection, as will be explained.

To disconnect the assembly shown in Fig. 1, the member 3 is turned upward upon the drill pipe until it disengages the coupling. In racking the drill pipe, the key member 3 remains on the pipe in readiness for the next connection but is spaced from the end of the pipe so that it is unlikely to be damaged. The slots 3d are for the purpose of engaging a special wrench for turning the member 3 downward in forming the connection or turning it upward to break the connection.

When the drill pipe is set down upon the coupling shoulder 2d, before the spiral key member 3 is inserted, the continuous spiral land 1b of the drill pipe should be slightly lower, such as $\frac{1}{32}''$, than the opposing continuous spiral land 2b of the coupling. This is so, because, if there should be any mud upon the shoulder 2d, the same might be compressed into a solid shim which would prevent the drill pipe from going down to where the spiral lands of the drill pipe and coupling would be opposite each other to admit the spiral key of the member 3. Another reason why the spiral land of the drill pipe should be slightly lower than the opposing spiral land of the coupling is to avoid the necessity for extreme accuracy in construction; for, if the drill pipe should seat upon the shoulder 2d while the spiral land of the drill pipe were slightly above the opposing spiral land of the coupling, the spiral key member 3 could not be inserted.

Figure 2:
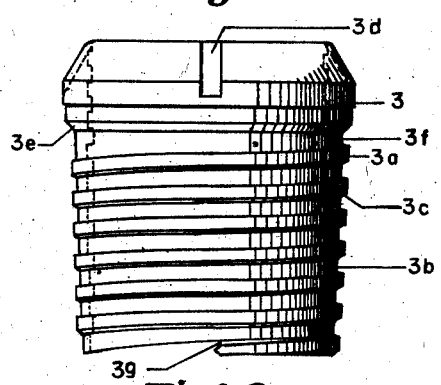
Fig. 2 is an outside view of the spiral key member shown at 3, assembled in Fig. 1.

It will be seen in Fig. 2 that the lower side of spiral key 3a has a taper adapted to engage with a corresponding taper on the upper side of the spiral land within the coupling. If, for example, the spiral lands 1b, 2b, key 3a, and their mating keyways each measure $\frac{1}{4}''$, vertically, and the taper 3c measures $\frac{1}{16}''$, vertically; the spiral key member 3 will still engage between the members 1 and 2 if the spiral lands on the drill pipe are $\frac{1}{16}''$ lower than their opposing lands in the coupling when the end of the drill pipe is resting upon the shoulder 2d. The tapered surface 3c, coacting with its mating taper upon the spiral land 2b, accomplishes this slight jacking up of the drill pipe, resulting in the clearance 1d between the drill pipe and coupling.

It will be observed that the outside diameter of the spiral drill pipe land 1b is greater by twice the thickness of the land than the outside diameter of the lower end of the drill pipe joint upon which the spiral is formed, the bottom of the intervening spiral keyway being approximately in line with the lower outer surface of the drill pipe. The lands 1b of the drill pipe, of course, should be formed upon a sufficient length of the drill pipe to permit the member 3, engaging over them, to be turned or screwed upward far enough to permit the drill pipe to be seated upon the internal shoulder 2d of the coupling.

The tubular spiral key member 3 is straight or of uniform diameter inside, except for the spiral cut between the coils of the key 3a, but is tapered outside. The spiral keyways on the inside and the outside of the member 3 and the similar keyways between the spiral lands upon the drill pipe and within the coupling are of equal and uniform thickness or depth and all angles are right, except the slope 3c upon the under side of the key 3a and the mating slope on the upper side of the spiral land 2b in the coupling. Each of these slopes, for example, may be at 30° to the horizontal. The turns of the spiral key 3a of the member 3 are closely slidable between the lands 1b and 2b of the drill pipe and coupling, respectively. The slopes 3c may be omitted and a right angle cut employed there and upon the upper edge of the lands 2b, if such precison be observed in manufacturing that the drill pipe and coupling lands will be positioned exactly opposite each other when the drill pipe is landed upon the coupling shoulder 2d. Whether the slope 3c be employed or not, a portion of the lower end of the spiral key may be freed by cutting the web 3b, as shown at 3g, Fig. 1. If this lower portion of the key so freed by this cut be then bent slightly outward so it will engage with the upper end of the spiral 2b of the coupling, such engagement will aid in consummating the engagement between the spiral key and the coupling. The tapered core 3b may be several times as thick in section at the upper end than at the lower end. This tapered core connecting the curved turns of the continuous spiral key 3a is formed by and between spiral keyways of uniform and equal depth, shown cut clockwise on inside and outside of the member 3. The taper of the core 3b may be such that the drill pipe and coupling will become disconnected by four to six anti-clockwise turns of the member 3.

Manifestly, in all forms of this invention, the spiral key and coacting lands may be formed either clockwise or anti-clockwise; and, in either event, the drill stem may be rotated in either direction without danger of the joints, such as shown in Fig. 1, becoming accidentally disconnected, because, the rotary thrust of the drill stem is borne by the enmeshed lands 1a and 2a, Fig. 8. The spiral key 3a, coacting with the spiral lands 1b and 2b, supports the weight of the drill pipe and resists all forces tending to pull apart the drill pipe and coupling. This resistance is equal, of course, to the force that would be required to shear all coils of the spiral key 3a or all coils of lands 1b and 2b, respectively, of the drill pipe and coupling. The counterbore 2c within the coupling and the turned out portion 3f upon the spiral key member 3 are for manufacturing convenience only in providing a coming out place for the keyway cutting tool.

The continuous slot between the several turns of the key 3a and the slots forming the spiral lands 1b and 2b, for example, may be $\frac{3}{16}''$ to $\frac{5}{16}''$ wide by a depth of $\frac{1}{16}''$ to $\frac{5}{32}''$, and six to nine returns of the key 3a, ordinarily, will be found satisfactory, while, as stated, the taper or the core 3b may be such that four to six turns will connect or disconnect the drill pipe and coupling.

It will be understood that the spiral slot between the spiral land 2b in the coupling must register with the spiral key 3a when, pursuant to the guidance of the drill pipe spiral, the several turns of that key are engaging under the several turns of the land 2b in the coupling. The drill pipe and coupling vertically engaged lands 1a and 2a are made and positioned so that they will enmesh properly to cause this registration.

The U-cup 4, which may be of leather or any other tough, expansible substance, fitted within a recess interior of the coupling 2, is adapted to be expanded into sealing engagement between members 1 and 2 by the pump fluid, thereby preventing any leakage through the slight clearance between the drill pipe and coupling. Manifestly, V-packing or any other suitable form or kind of packing may be substituted for the U-cup shown.

Figure 3:
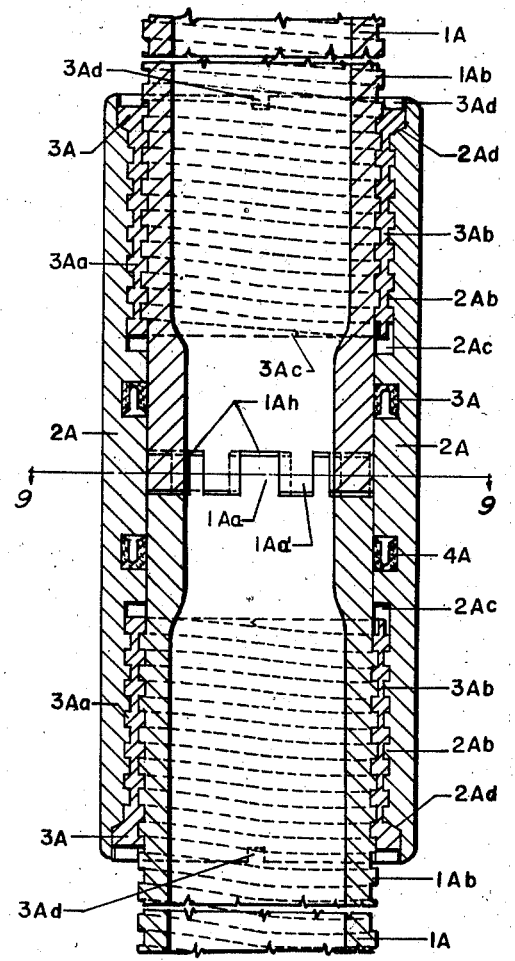
Fig. 3 is a longitudinal section through the first modified form of this invention.
Figure 4:
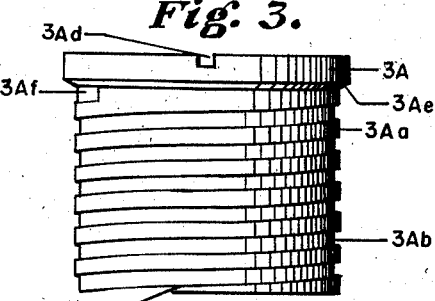
Fig. 4 is an outside view of the spiral key member shown at 3A, Fig. 3.
Figure 9:
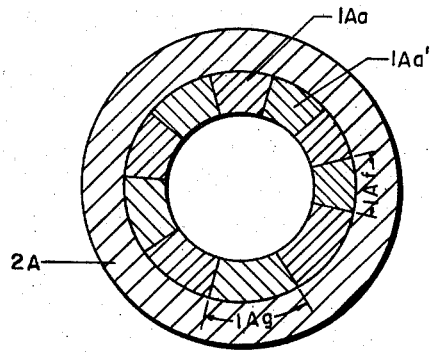
Fig. 9 is a cross section on the line 9—9, Fig. 3.

Figs. 3, 4, and 9 illustrate the first modified form of this invention. In many instances this form may be preferred to the preceding form.

The drill pipe 1A is closely slidable within the central portion of coupling 2A where the ends of the drill pipe are formed into enmeshing projections 1Aa and 1Aa', as appears in Fig. 9. These projections are, preferably, of a uniform length, which may be approximately $1\frac{1}{2}''$, and of different widths. For example, the narrowest land 1Af may be $\frac{3}{4}''$ wide by $\frac{3}{4}''$ deep and the widest land 1Ag may be $1\frac{3}{8}''$ wide while the other intermediate lands may be uniformly and progressively wider than the width 1Af, as shown in Fig. 9.

The U-cups 4A, or other suitable form of packing, are adapted to prevent leakage of pump fluid between the drill pipe and coupling, as was stated for the similar construction shown in Fig. 1, and discussed in connection therewith.

The continuous spiral land 1Ab, exterior of the drill pipe is formed upon a portion of the pipe slightly more than twice the length of the key member 3A and is of the same width, depth, and pitch as the continuous spirals 2Ab within the coupling, the continuous spiral key 3Aa of the spiral key member 3A being adapted to be rotatably and slidably engaged therewith, as appears in Fig. 3. The web or core 3Ab intermediate of and connecting the circular turns of the key 3Ab is of equal thickness between all of the turns. The spiral key member 3A is straight, being, in this respect, different from the similar but tapered member 3 in Figs 1 and 2.

The counterbores 2Ac within the coupling and the turned off portion 3Af of the spiral key member 3A are for manufacturing convenience only in providing a coming out place for the forming tool.

To assemble the connections, as shown in Fig. 3, the lower connection, ordinarily, will be made first. The lower spiral key 3A is turned or screwed over the end of the lower joint of drill pipe far enough to permit the lower joint to be inserted within the coupling to the middle thereof. This lower spiral key member 3A is then turned or screwed backward into engagement between the opposed spiral lands of the drill pipe and coupling, as appears in Fig. 3.

The upper spiral key member 3A is then turned or screwed upon the upper joint of drill pipe until the upper joint can be seated upon the lower joint with the end lands 1Aa and 1Aa' interfitting to thereafter prevent relative rotation and to thus transmit torque. The circular turns of the drill pipe spiral then should be, preferably, slightly below the opposed spirals of the coupling. The thickness of the starting key end, measured longitudinally of the member 3 and indicated at 3Ac, preferably, should be approximately one-fourth the distance through the key 3Aa measured in the same direction. The upper spiral key member 3A, being then turned or screwed into the position shown in Fig. 3, the upper joint of drill pipe will be raised slightly by the spiral key 3Aa, resulting in the end clearance between the drill pipe lands and slots, indicated at 1Ah, which clearance avoids extreme accuracy in construction and provides that mud between the ends of the drill pipe will not prevent the assembly from being easily accomplished, as was stated for the similar clearance 1d in Fig. 1. It will be observed that the upper end of the key member 3 engages its circular shoulder 3Ae upon the seat 2Ad for the purpose of locking the assembly together.

The starting land within the coupling must register with the starting end 3Ac of the spiral key when that end, pursuant to the guidance of the spiral on the drill pipe, is at the starting point of the spiral land in the coupling. The drill pipe end lands 1Aa and 1Aa' are properly positioned to produce this registration.

In drilling practice, the lower connection, ordinarily, will be left together and the "break out" will be made in the upper end of the coupling, but since both connections are alike, the lower one may become the upper one and may be mated with another lower one when the drill stem is moved to another location and the ends become reversed in moving and reassembling the joints. The connection cannot be "backed off" in the well because of the enmeshed drill pipe projections 1Aa and 1Aa'. No more force will be required to remove the spiral key member 3A after the drill pipe has been "run on" than would be required to remove it immediately after the connection was formed for the reason that the enmeshed drill pipe extensions 1Aa and 1Aa' absorb all of the drilling torque, and furthermore, permit the drill pipe to be rotated in either direction.

It will be observed in the assembly that the outer end of the key member 3A is flush with the end of the coupling, and that no part of the key member can be contacted by the casing, wall of the well bore, or cavings which might possibly back it out in the well. The wrench slots 3Ad are for the evident purpose of applying a special wrench to put in the member 3A or to take it out.

To take apart the connection at either end of the coupling 2A, merely turn the spiral key member 3A out of the coupling, leaving it on the drill pipe in readiness for the connection to be quickly remade.

Figure 5:
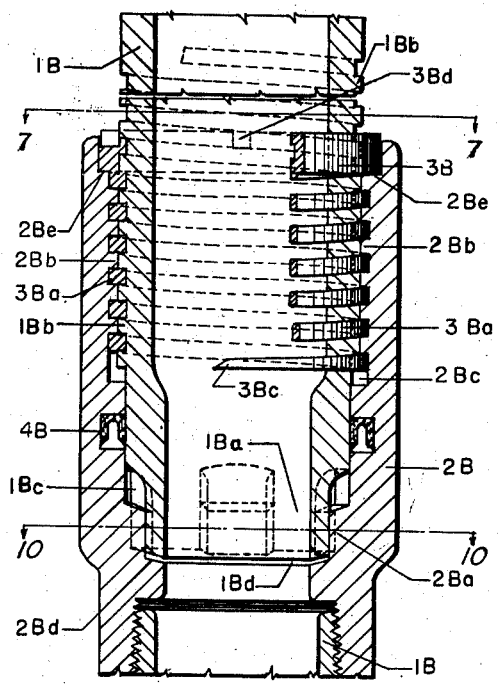
Fig. 5 is mainly a longitudinal section through the second modified form of this invention.
Figure 6:
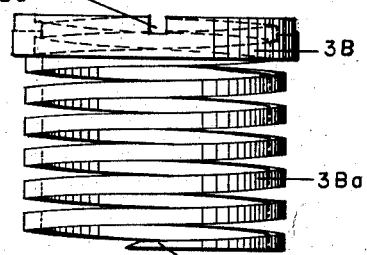
Fig. 6 is an outside view of the spiral key member shown at 3B, Fig. 3.
Figure 7:
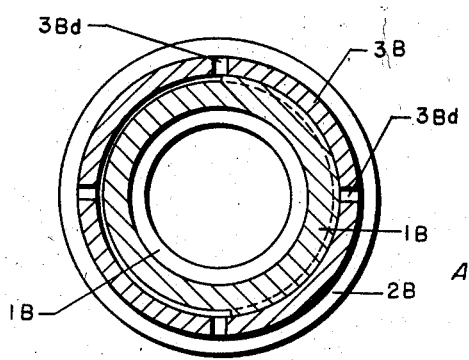
Fig. 7 is a cross section on the line 7—7, Fig. 5.

Figs. 5, 6, 7, and 10 illustrate the second modified form of this invention in which the connecting element is a spiral key which may be cut out of a cylindrical steel tube or may be formed into the corkscrew shape, shown in Fig. 6, by bending a straight key. The lower joint of drill pipe 1B may be threadedly joined within the coupling 2B and further secured to it by a weld, as at 1e, Fig. 1. The upper joint of drill pipe 1B is closely slidable within the coupling 2B and has lands 1Ba formed upon its lower end by the cuts 1Bc which lands are adapted to enmesh with the lands 2Ba of the coupling 2B, as appears in Fig. 10. The enmeshing lands may be of equal depth and length. A depth equal to approximately one-half the wall thickness of the lower upset end of the drill pipe, ordinarily, will be found satisfactory, although the cuts 1Bc forming the lands may extend through the drill pipe and the lands 2Ba made as thick as the drill pipe. In such case, a section through the lands 1Ba and the lands 2Ba would be as appears in Fig. 9.

Figure 10:
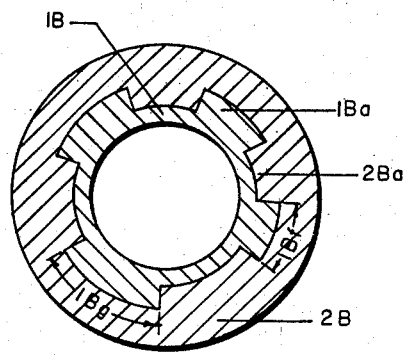
Fig. 10 is a cross section on the line 10—10, Fig. 5.

For 4½" drill pipe the width of the narrowest land, for example, may be ¾", indicated at 1Bf, Fig. 10, and the widest land may have a width of 1½", indicated at 1Bg, while one other land may be proportionately larger than indicated at 1Bf and the remaining land proportionately smaller than indicated at 1Bg. All of the lands upon the end of the drill pipe and the upstanding lands 2Ba of the coupling, as in the preceding embodiments, may have a uniform length of approximately 1½". The purpose of these enmeshed lands is to withstand the rotary thrust of the drill pipe, which may be rotated in either direction, and also to cause the spiral starting key 3Bc to properly engage with the spiral lands of the coupling, as was stated in connection with Fig. 3.

The U-cup 4B, V-packing, or other suitable packing, is fitted within an internal recess within the coupling 2B for the purpose of preventing leakage of pump fluid through the slight clearance between the drill pipe and coupling, as was stated for the similar means in connection with Figs. 1 and 3.

The continuous spiral land 1Bb exterior of the drill pipe and the similar continuous spiral land 2Bb interior of the coupling are of the same width, depth, and pitch. The spiral key 3Ba is adapted to be rotatably and slidably engaged between the opposing circular turns of the drill pipe and coupling spirals. The continuous drill pipe spiral land 1Bb, with which the spiral key 3Ba engages, should be formed upon the drill pipe for a distance equal to slightly more than twice the vertical length of the spiral keys 3Ba. The counterbore 2Bc within the coupling is merely for convenience in manufacturing by affording a coming out place for the forming tool used to cut the continuous coupling spiral land 2Bb.

To assemble, as in Fig. 5, the drill pipe is set down upon the internal shoulder 2Bd of the coupling after the spiral key member 3B has been first engaged with the drill pipe spiral 1Bb and positioned high enough to permit the drill pipe to so engage said shoulder. The spiral key 3Ba is then turned clockwise by a special wrench engaged within the slots 3Bd of the head 3B until the head engages upon the shoulder 2Be within the counterbore in the upper end of coupling 2B, as appears in Fig. 5.

The connection, shown in Fig. 5, may be taken apart by simply removing the spiral key and allowing it to remain upon the drill pipe until needed to remake the connection.

When the drill pipe is inserted within the coupling the coils of the spiral land 1Bb of the drill pipe should be slightly lower than the opposing coils 2Bb of the coupling in order that the starting key 3Bc will be certain to start if the drill pipe should be set down in mud within the coupling and, furthermore, to avoid extreme accuracy in construction, as was explained in relation to engaging the similar part 3A in Fig. 3. Engaging the spiral key 3Ba in Fig. 5, brings the spiral lands of the drill pipe and coupling into registration, as in Figs. 1 and 3, and produces the clearance 1Bd between the end of the drill pipe and the coupling shoulder 2Bd.

As stated for the next preceding form of this invention, the starting land within the coupling must register with the starting end 3Bc of the spiral key when that end, pursuant to the guidance of the spiral on the drill pipe, is at the starting point of the spiral land in the coupling. This is determined by proper position of the engagement between the end lands 1Ba of the drill pipe with the lands 2Ba of the coupling (see Fig. 10).

It is apparent that the spiral key 3Ba may be made stronger and more rigid by forming it to taper like the member 3 in Fig. 1, in which event, it would resemble that member with the web or core 3b omitted.

Tool joints may be dispensed with in all forms of this invention, because, either form of connection herein shown not only permits the drill pipe to be rotated in either direction, but is quicker and easier than tool joints in the make-up and break-out of the drill pipe.

Unlike drill pipe and coupling threads, all forms of the spiral key (Figs. 2, 4, and 6) will not gall within the mating keyways because the rotary thrust on the drill pipe is borne by the enmeshed lands of the drill pipe and coupling member (see Figs. 8, 9, and 10).

In either form of this invention, little or no more force will be required to remove the spiral key member after the drill pipe has been "run on" than would be required to remove it before then, for the same reason that the keys will not gall, i. e., because the enmeshed engagement of the drill pipe and coupling prevents the engaged spiral keys and lands from being subjected to the rotary thrust of the pipe. The danger to workmen in making-up and breaking-out drill pipe will also be greatly reduced by enabling such connections and disconnections, as herein set out, to be made without the employment of great force, as is now required for that purpose, and in which operations a large percentage of accidents on drilling rigs now occur.

Preferably, all connections of the drill stem, including the bit, should be made by employing some form of this invention, although either of these constructions may be employed only in joints where the drill stem is to be most frequently connected and disconnected in drilling.

The several embodiments of this invention afford all of the flexibility of threaded connections in assembling the drill stem without any of the undesirable features of threaded connections, such as burning of threads, undue crystallization of the pipe, accidental "backing off," the constant employment of great force in "making up and breaking out"; and the ever present danger to workmen resulting from the great force required to make-up and break-out threadedly connected drill pipe. There are no threads to "burn" in any form of this invention and crystallization will be minimized due to the absence of torque upon the connecting means.

All of the advantages and attained objects set out for and in connection with either embodiment of this invention are applicable to all of the constructions herein illustrated and described.

Obviously, either form of this invention may be employed for pipe unions and means for connecting shafts together, as well as for other similar or related purposes. Where the word "pipe" is employed in the claims herein, it is therefore intended that shafts, rods, staffs and the like are included. Where employed as a pipe union the enmeshed lands between the drill pipe and coupling may be omitted and packing added in the recesses 2c, Fig. 1, 2Ac, Fig. 3, and 2Bc, Fig. 5, which packing will be compressed by the spiral key members to prevent leakage. In such case a metallic ring may be placed between the key member and the packing.

It is apparent that many minor changes in construction and substitution of other parts for those herein shown and described may be employed within the scope and purpose of the stated objects and appended claim; and I reserve the right to make such changes and substitutions.

I claim:

In a drill stem connection: a pair of telescoping sections having interengaging means to prevent relative rotative movement and means to prevent axial separation comprising: an internal spiral key-way groove formed on one section and an external spiral key-way groove formed on the other section and confronting said internal groove, said grooves complementing each other to define a complete key-way; and a spiral key positioned in and completely filling the cross sectional area of said key-way.

ALEXANDER BOYNTON.